United States Patent [19]

Nelson

[11] E Re. 29,322

[45] Reissued July 26, 1977

[54] VALVE AND ACTUATOR ASSEMBLY

[75] Inventor: Norman A. Nelson, Houston, Tex.

[73] Assignee: Teledyne Merla, div. of Teledyne, Inc., Garland, Tex.

[21] Appl. No.: 622,601

[22] Filed: Oct. 15, 1975

Related U.S. Patent Documents

Reissue of:

[64] Patent No.: 3,765,642
Issued: Oct. 16, 1973
Appl. No.: 184,837
Filed: Sept. 29, 1971

[51] Int. Cl.[2] ..... F16K 3/02; F16K 31/143

[52] U.S. Cl. ..... 251/14; 251/327; 251/282

[58] Field of Search ..... 251/327, 282, 326, 329, 251/14

[56] References Cited

U.S. PATENT DOCUMENTS

| | | | |
|---|---|---|---|
| 3,029,060 | 4/1962 | Anderson | 251/14 |
| 3,331,583 | 7/1967 | Baker | 251/282 X |
| 3,378,224 | 4/1968 | Boyle | 251/14 |
| 3,385,561 | 5/1968 | Whalen | 251/14 |
| 3,402,912 | 9/1968 | Watkins | 251/14 |
| 3,889,922 | 6/1975 | Peters | 251/14 |

*Primary Examiner*—Arnold Rosenthal
*Attorney, Agent, or Firm*—James L. Jackson

[57] ABSTRACT

A valve and actuator assembly having a mechanism adapting such assembly for remote actuation by a pressure medium such as hydraulic or pneumatic fluid and including means for controlling the development of resultant forces acting upon the valve stem of the valve. The valve and actuator assembly includes safety means for rendering the valve safe in response to the development of predetermined unsafe conditions and is adapted with a manual override system allowing the valve to be manually opened or closed regardless of the condition of the safety means. Mechanical or fluid actuated interlock means is provided to render fluid actuating means inoperative and is also provided with means for rendering the mechanical override inoperative. The assembly is adapted to lock out the fluid actuator system to allow the assembly to be serviced without risk of inadvertent actuation by automatic systems. Effluent pressure may be communicated to the outer extremity of the valve stem to balance the force applied to the inner extremity of the valve stem by effluent pressure within the valve.

37 Claims, 13 Drawing Figures

Norman A. Nelson
INVENTOR

BY Arnold, White & Durkee

ATTORNEYS

Norman A. Nelson
INVENTOR

BY Arnold, White & Durkee

ATTORNEYS

Norman A. Nelson
INVENTOR

BY Arnold, White & Durkee

ATTORNEYS

Norman A. Nelson
INVENTOR

BY Arnold, White & Durkee

ATTORNEYS

FIG. 7
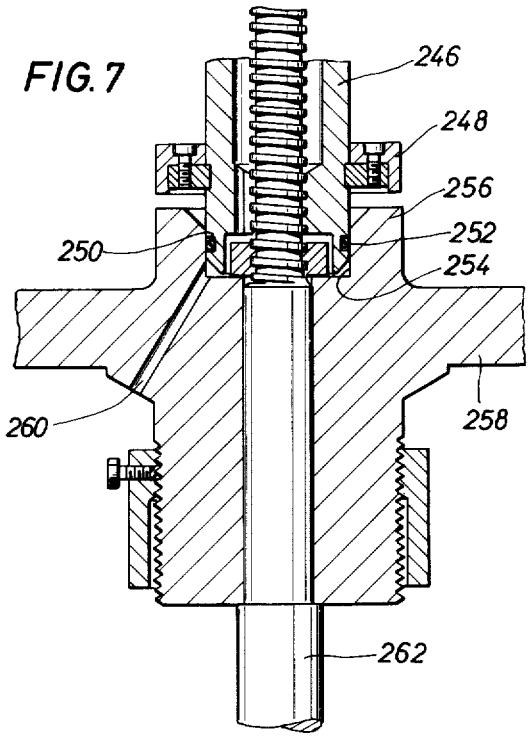
FIG. 8
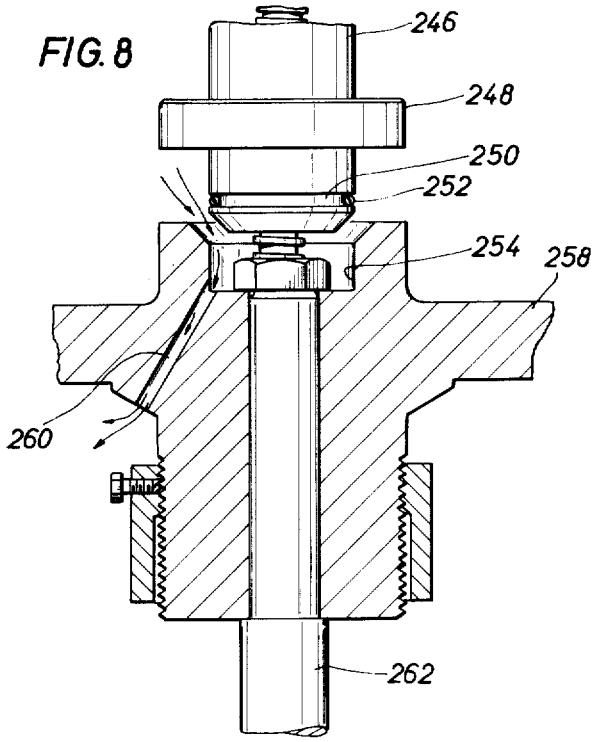
FIG. 11
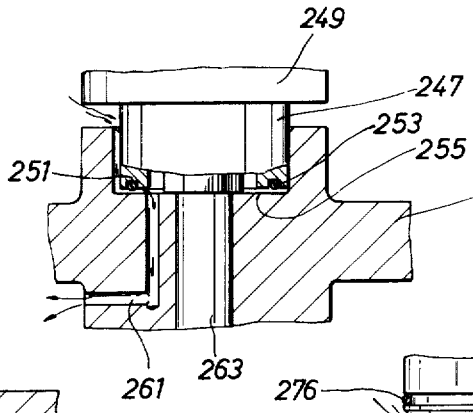
FIG. 9
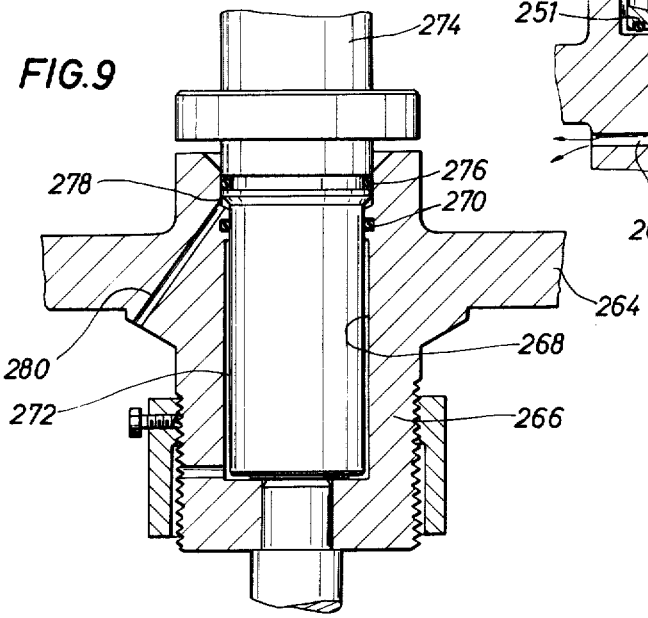
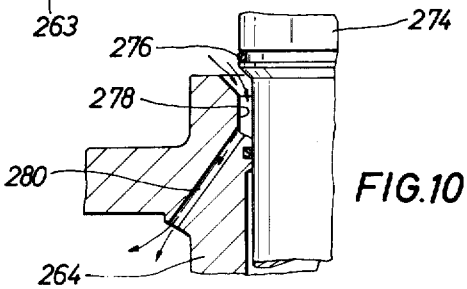
FIG. 10
Norman A. Nelson
INVENTOR
BY Arnold White & Durkee
ATTORNEYS Norman A. Nelson
INVENTOR BY Arnold, White & Durkee

ATTORNEYS

VALVE AND ACTUATOR ASSEMBLY

Matter enclosed in heavy brackets [ ] appears in the original patent but forms no part of this reissue specification; matter printed in italics indicates the additions made by reissue.

FIELD OF THE INVENTION

This invention relates generally to gate valves and more particularly concerns gate valves of the rising stem type having power actuators associated therewith for remote control of gate valves.

BACKGROUND OF THE INVENTION

Due to the remote locations of oil wells and pipelines, it is often desirable that valves at such locations be provided with means permitting remote control. Remote or automatic control is essential for automation programs and safety systems. One common method of providing such control has been to attach a fluid actuated piston operator to the stem of a rising stem gate valve. By pressurizing one side or the other of the piston, the valve can be opened or closed from a point remote from the valve. To provide fail-safe operation in the event that one of the lines carrying pressure fluid to the operator is ruptured or if for some other reason the remote control system fails, it is desirable to provide such valves with means to automatically position the valve in a predetermined safe position. In such event, it is also desirable to have the valve provided with means permitting manual operation. It is also desirable to render a manual operating system inoperative to provide a safe environment for a worker conducting repair or maintenance on a flow system controlled by a valve to which the operator might be attached.

It is also desirable to provide an actuator system that ensures against actuation of the valve by remotely located automatic sensors. If the valve is actuated while being serviced the valve and actuator assembly could be damaged or other damage could occur.

Where the valve is being employed to control high pressure fluid such fluid generally acts upon the surface area defined by the cross-sectional area of the valve stem and develops a force acting on the stem that must be overcome by the fluid motor of the actuator and by the manual override system. It would be desirable to eliminate or render inoperative the force ordinarily acting on the valve stem threads to permit easy manual operation.

SUMMARY OF THE INVENTION

In one form of the present invention all of these functions are accomplished. A rising stem valve is provided with a piston type valve actuator. To ensure that the valve will automatically completely close in the event that remote control system fails, a biasing means is attached to the piston of the actuator. The biasing means is of a sufficient magnitude so that if pressure on the piston fails, the valve will automatically completely close or open as desired. By locating the port in bottom half of the gate, the valve will automatically open upon failure of the remote control system. To permit manual operation of the valve after such failure and automatic positioning, manual operating means are provided. The stem of the valve is threaded into the stem of the manual actuator and by rotating the hand-wheel attached to the stem of the operator, the stem of the valve disengages from its connection with the stem of the operator and manually moves the gate.

Pressure is transmitted through the valve stem to a pressure chamber located outwardly of the stem which serves to balance the fluid pressure forces acting on the stem to allow the valve to be manually actuated by relatively small actuator torque forces even when the valve is employed to control high pressure fluid.

It is a primary object of the present invention to provide manual operating means for remote controlled piston operated valves.

It is a general object to provide a piston operated gate valve incorporating means for automatic fail-safe positioning and manual operation.

It is another object to provide simple efficient means for manually operating a piston operated valve.

It is another object of the present invention to provide a mechanism for balancing the pressure acting on the valve stem.

It is an even further object to provide a mechanism for locking out an actuator to prevent operation thereof, if desired.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description and are shown in the accompanying drawings, forming a part of the specification, wherein:

FIG. 7 is a fragmentary sectional view of a valve operator representing a further modified embodiment of the present invention and illustrating a mechanism for selectively rendering the valve operator inoperative.

FIG. 8 is a fragmentary sectional view illustrating the safety mechanism of FIG. 7 in the position deactivating the valve operator.

FIG. 9 is a fragmentary sectional view illustrating a modified safety mechanism for rendering the valve actuator inoperative.

FIG. 10 is a fragmentary sectional view illustrating the safety mechanism of FIG. 9 in the deactivated position thereof.

FIG. 11 is a fragmentary sectional view of the valve and actuator assembly illustrating a further modified safety mechanism for rendering the valve actuator system inoperative.

Figure 1:
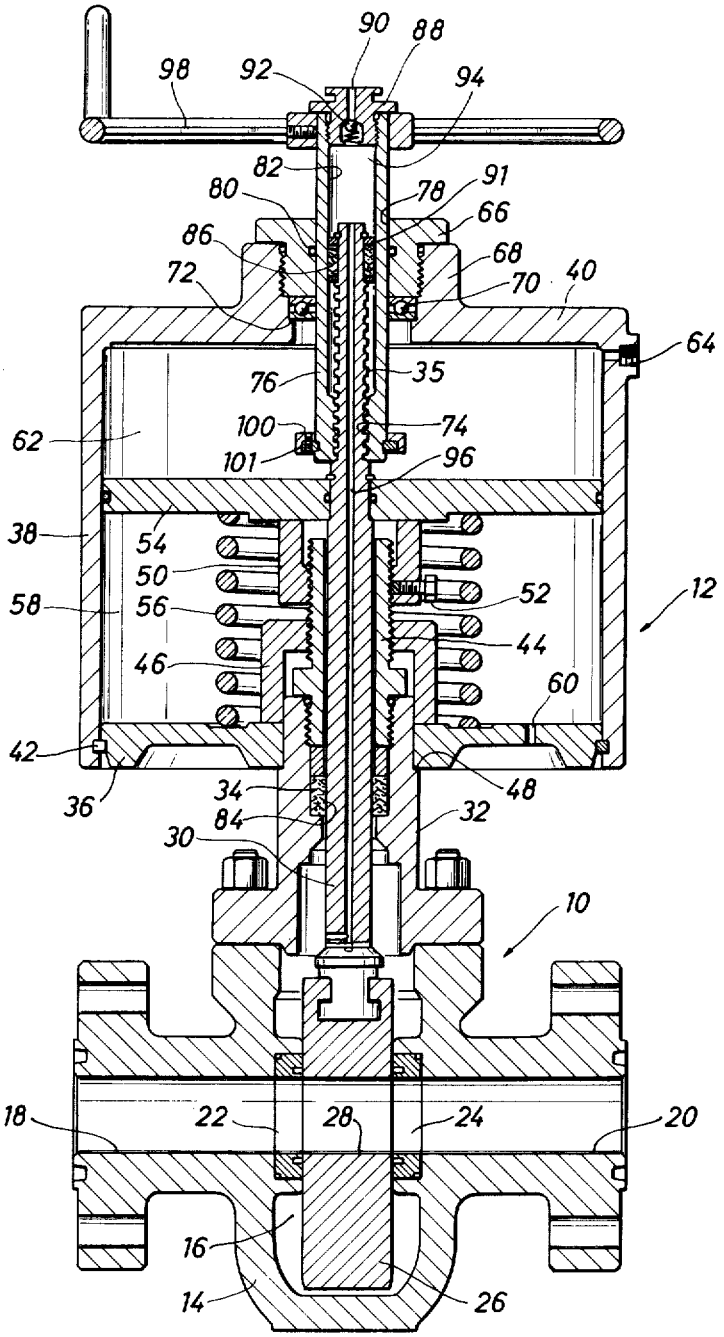
FIG. 1 is a vertical sectional view of the valve of the present invention incorporating both the safety feature and the manual operating feature showing the valve in the open position as result of being actuated by the fluid actuator.

Referring now to the drawings and first to FIG. 1, a rising stem gate valve 10 is provided with a piston type valve actuator 12.

The housing 14 of the valve 10 is formed of a casting within which a chamber 16 is defined to receive the operating parts of the valve. Extending from the chamber 16 are aligned flow passages 18 and 20. The inner ends of the flow passages are provided with seats 22 and 24. Interposed between the seats 22 and 24 is a gate member 26. The gate assembly 26 has a passage 28 which registers with the passages 18 and 20 in open position and a solid portion which blocks flow in closed position. As will be explained subsequently, locating the passage 28 in the top half of the gate assembly will cause the valve to automatically close upon loss of pressure in the remote control system and locating the passage in the bottom half of gate assembly, will cause the valve to automatically open. Nonrotatably attached to the top of the gate 26 is a stem 30 which extends through a bonnet 32 and packing 34. Movement of the stem 30 results in corresponding movement of the gate 26. The upper end of the stem is provided with male threads 35, the purpose of which will be explained subsequently.

Attached to the top of the bonnet 32 is the piston operator 12. The body of the operator is comprised of a base member 36, received at the top of the bonnet 32, a piston cylinder 38 and a cap 40 closing the top end of piston cylinder 38. The cap 40, if desired, may be formed integrally with the piston cylinder 38 or it may be attached to the piston cylinder in any desirable manner. The piston cylinder is secured to the base member 36 by a snap ring 42 received within complementary grooves formed within the base member and the piston cylinder. A connector element 44 is threadedly secured to the upper extremity of the bonnet 32 and retains the packing 34 in bonnet 32 and threadedly receives a retainer element 46 that engages the base member 36 and retains the base member in immovable relation with a shoulder 48 defined on bonnet 32. The retainer member 46 effectively provides positive alignment of the base member relative to the bonnet member and effectively prevents the slight movement that is ordinarily found in pneumatic and hydraulic valve actuators of this general type. A stop member 50 is also threadedly received by the connector element 44 and is secured in position by a bolt member or set screw 52. The stop member 50 is adapted to be engaged by a piston member 54 movably received within the cylinder 38 in order to limit downward movement of the piston member and thereby positively locate the valve port 28 with the valve passages 18 and 20 in the open position thereof. A compression spring member 56 is interposed between the base member 36 and the piston 54 and is operative to maintain a bias urging piston member 54 upwardly against the forces developed by fluid pressure above the piston and acting to drive piston member 54 downwardly. The piston divides the actuator housing into a lower chamber 58 that may be vented to the atmosphere by a vent aperture 60 and an upper chamber 62 adapted to receive pressurized actuating fluid introduced through an inlet aperture 64.

The actuator may be provided with a bearing retainer 66 that is threadedly received by an internally threaded boss 63 connected to or formed integrally with the cap 40. The bearing retainer is operative to maintain a thrust bearing member 70 in engagement with a thrust shoulder 72 defined by end cap 40.

The upper threaded extremity of the stem 30 may be received by the internal threads 74 of a tubular drive element 76 that extends in movable relation through an aperture 78 defined within the bearing retainer 66. A sealing member 80 maintains a dynamic seal between the bearing retainer 66 and the exterior cylindrical surface of the tubular drive member 76. The tubular drive member may be provided with an internal bore 82 of substantially the same cross-sectional dimension as the cross-sectional dimension defined by the internal diameter 84 of the packing member 34 when sealing on stem 30.

An outer packing member 86 may be received by the upper extremity of the stem 30 and may be maintained in secure relation with the stem by a snap-ring 89 or the like and is operative to maintain a dynamic seal between the valve stem and the internal wall 82 of tubular drive element 76. For purposes of the present invention the outer packing is intended to be considered a part of the valve stem. The upper extremity of tubular drive element 76 is closed by a cap or, if desired, by a grease fitting 88 threadedly received within the tubular drive element and being provided with a fluid passage 90 that is controlled by a spring biased check valve 92 to allow the introduction of fluid such as lubricant into a pressure balancing chamber 94 defined outwardly of the packing 86 but preventing fluid pressure within chamber 94 from exiting through the passage 90.

Figure 2:
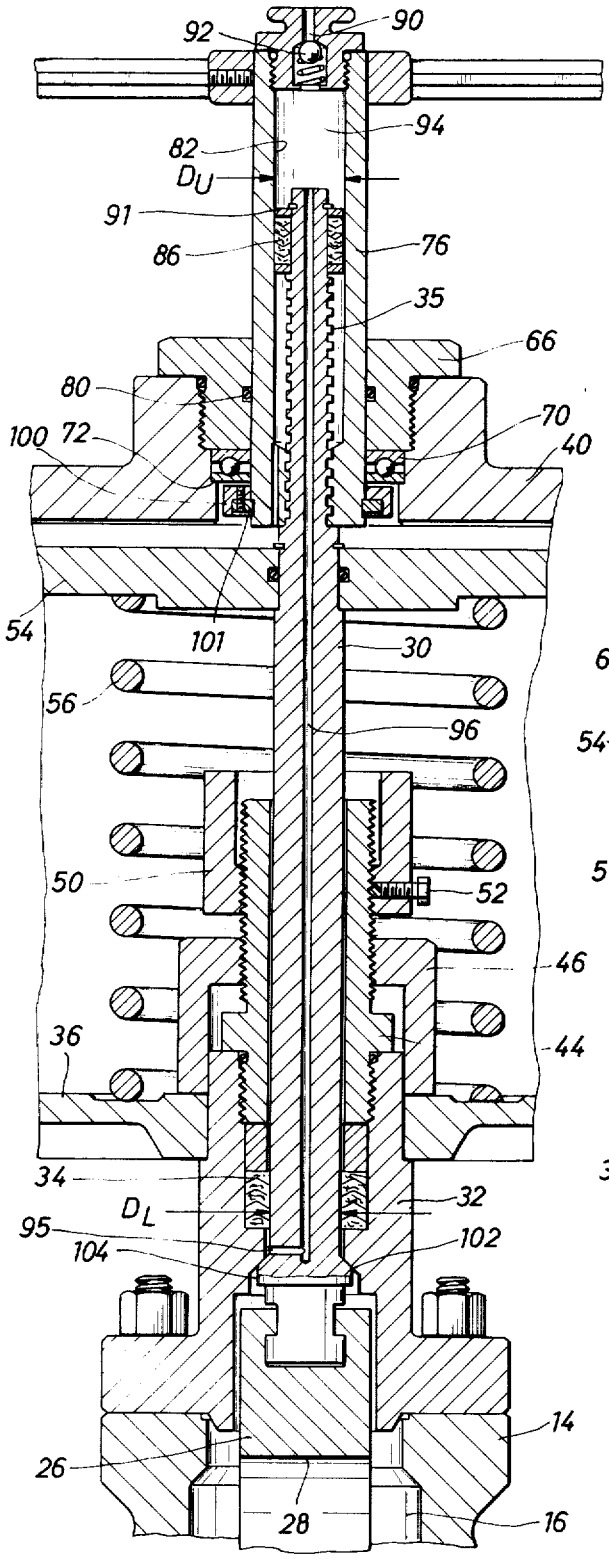
FIG. 2 is a fragmentary sectional view of the structure of FIG. 1 illustrating the valve and actuator structure after closure of the valve.

The valve stem 30 may be provided with an axial passageway 96 that is functional to conduct pressurized fluid from within the chamber 16 upwardly through the valve stem and gate connector element to the pressure balancing chamber 94, or if desired the passage 96 may terminate above the internal shoulder 104 as shown at 95 in FIG. 2. It is evident therefore that the upper and lower extremities of the valve stem 30, each being of substantially the same dimension, are subjected to the same fluid pressure and therefore cause forces to be developed by the effluent pressure at each extremity of the valve stem that are substantially balanced and which cooperate to develop a negligible resultant force regardless of the fluid pressure being controlled by the valve 10.

Figure 6:
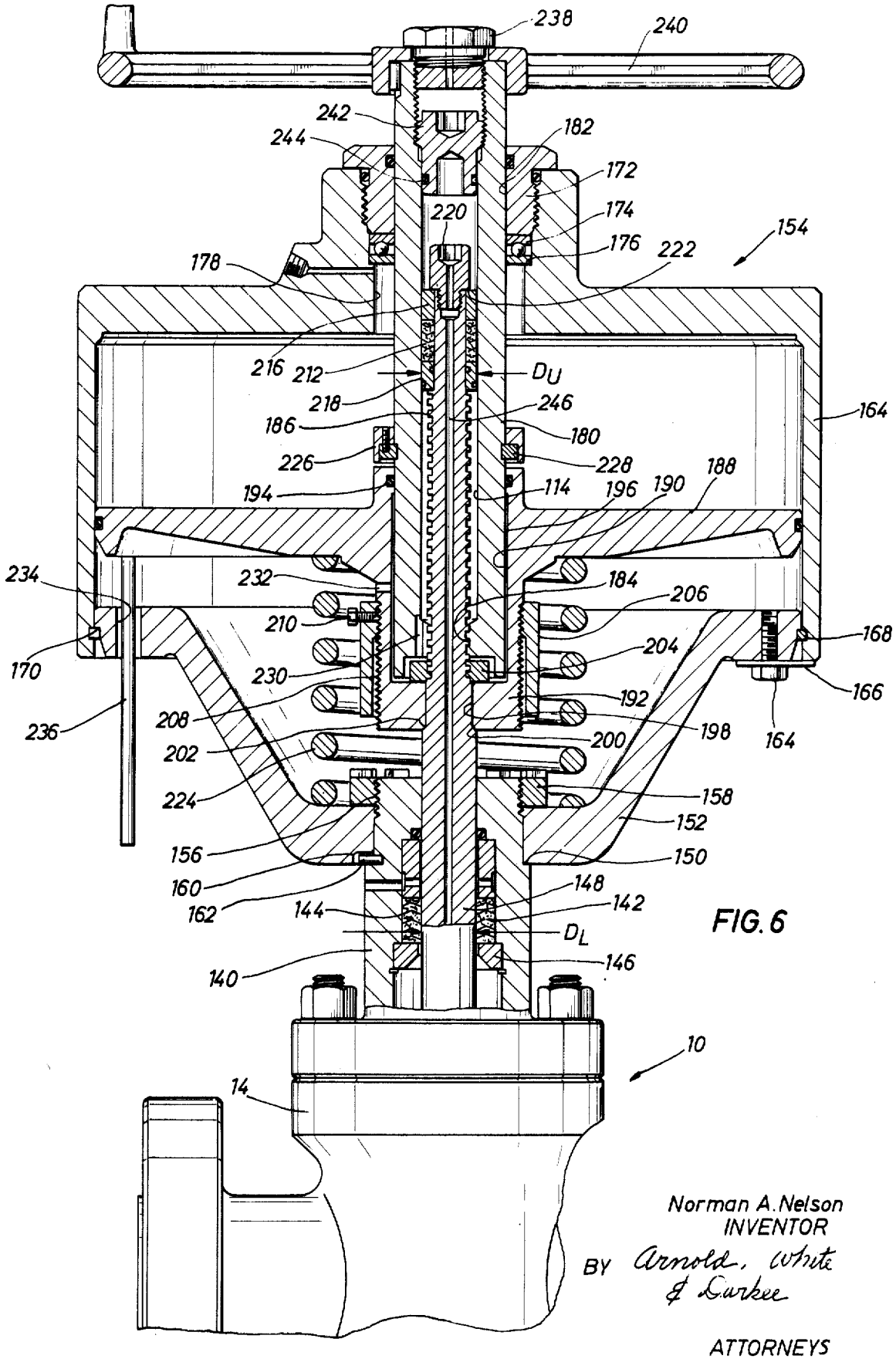
FIG. 6 is a sectional view of a modified embodiment of the present invention.

In the event it is desirable to have a downward or upward resultant force acting upon the valve stem, such can be readily accomplished by providing differential stem areas of specifically designed cross-sectional area. For example, as illustrated in FIG. 6, if the cross-sectional area of the valve stem $D_2$ is equal to the cross-sectional area $D_u$ of the piston the forces acting upon the valve stem will be balanced. If the cross-sectional area of the valve stem $D_2$ is greater than the cross-sectional area of the piston $D_u$, a bias will be exerted upwardly on the valve stem. Likewise, a downward bias will be exerted upon the valve stem if the cross-sectional area of the piston $D_u$ is greater than the cross-sectional area of the stem $D_2$. This feature effectively provides that the only force acting on the threads is that of moving the gate and overcoming the friction of the stem seal. At the same time, the stem threads are not exposed to the fluids contained in the valve chamber 16.

A handwheel 98 may be secured to the upper extremity of the tubular drive member 76 in any desirable manner and may be rotated causing the threaded engagement between the drive element 76 and the threads 35 of valve stem 30 to reciprocate the valve stem.

The tubular drive element 76 may be provided with a thrust shoulder 100 that is removably retained in assembly with the tubular drive element by a retainer ring 101 in the form of a snap-ring or segmented ring received within a groove formed in the periphery of the tubular drive element. A set screw 103 or the like may be employed to secure the retainer ring and thrust shoulder in assembly.

As illustrated in FIG. 1, the valve is disposed in its open position and the manual override system defined by the tubular drive element, the handwheel, and the threads of the valve stem are disposed in the inoperative positions thereof thereby allowing the piston 54 freedom of movement downwardly under the influence of hydraulic or pneumatic pressure and upwardly under combined bias forces of the spring member 56 and pressure contained in the valve chamber 16 acting in the stem area.

With reference now to FIG. 2, the valve and actuator assembly is disposed in the position of normal closure by the spring member urging the piston member upwardly causing a valve stem shoulder 102 to engage an internal shoulder 104 defined within the bonnet structure 32. This serves as the upward movement stop of the stem 30.

Figure 3:
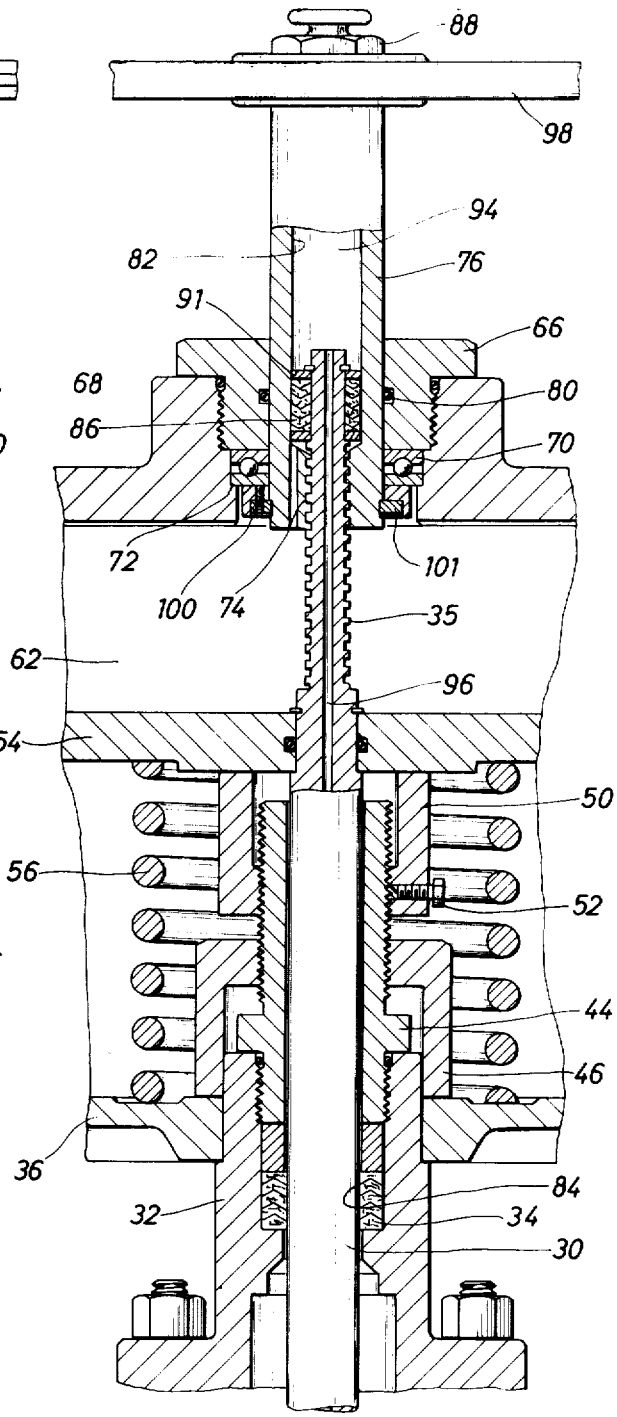
FIG. 3 is a fragmentary sectional view of the structure of FIG. 1 showing the valve and actuator structure after opening thereof by the manual override system.

As illustrated in FIG. 3, the valve and actuator assembly are disposed in the position achieved after actuation thereof to the open position by the manual override mechanism. To open the valve, handwheel 98 will be rotated thereby causing the tubular drive element to be driven upwardly on the valve stem threads until the shoulder 100 engages the thrust bearing member 70. After this has occurred the tubular drive element can no longer move upwardly and continued rotation of the hand wheel will force the valve stem 30 to move downwardly thereby causing valve element 26 to move downwardly aligning the port 28 with the inlet and outlet passages. In this condition application of fluid pressure into the chamber 62 of the actuator will not cause movement of the piston 54 because the piston will be disposed in engagement with the stop member 50. The compression spring 56 is also inoperative under this condition and is not capable of urging the piston member 54 upwardly. The valve and actuator assembly, under this condition, may be serviced without danger to servicing personnel because movement of the valve and actuator assembly will not occur in the event the actuator assembly is inadvertently energized by remote sensors or the like.

Figure 4:
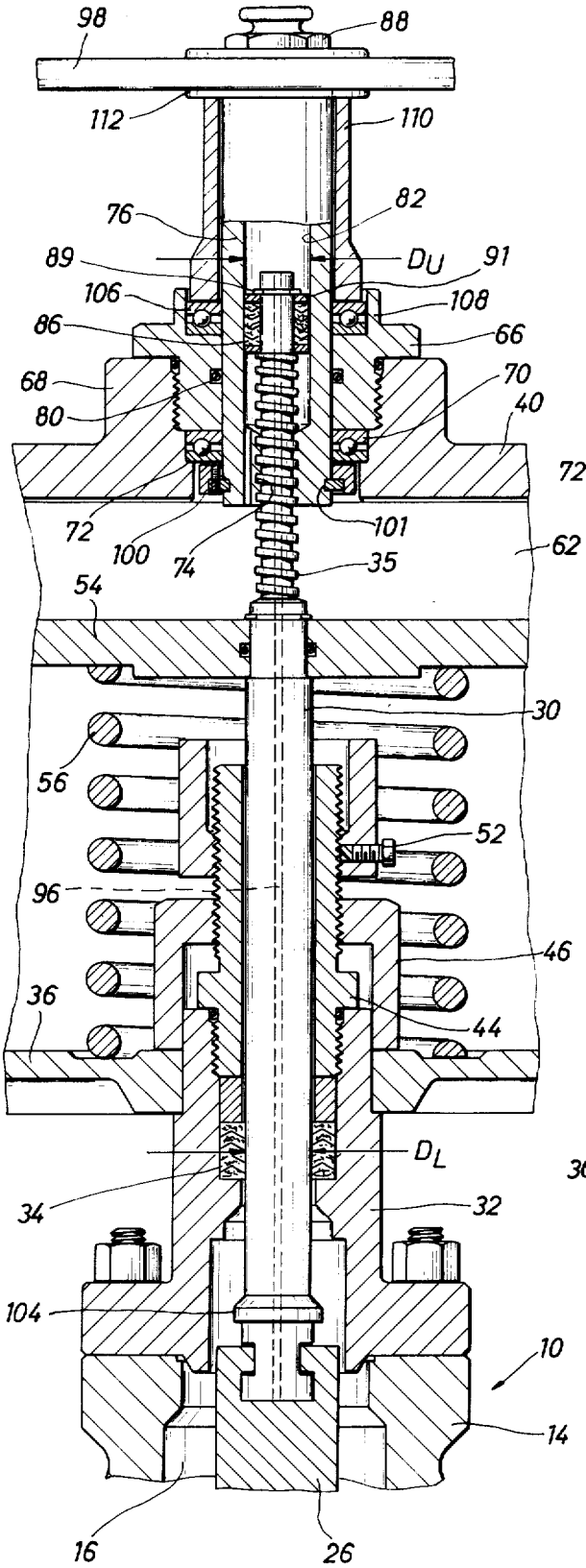
FIG. 4 is a fragmentary sectional view of the structure of FIG. 1 illustrating employment of a spacer to permit positive upward retraction of the valve stem.

With reference now to FIG. 4, the valve and actuator assembly may be provided with means for manually driving the valve element toward both the open and closed positions thereof. According to the present invention, such means may conveniently take the form illustrated where a thrust bearing member 106 is received within an annular bearing retainer extension 108 and is disposed about the movable drive element 76. A lock-out sleeve 110 is received about the upper extremity of tubular drive element 76 and is received in thrust engagement by the bearing member 106. The retainer sleeve is also disposed for engagement by a shoulder 112 of the hand wheel structure 98 thereby preventing downward movement of the hand wheel and tubular drive element when it is desired to temporarily prevent actuation of the power actuator system. Upward movement of the tubular drive element 76, under this condition, will be prevented by engagement between the thrust shoulder 100 and thrust bearing member 70. Since the tubular drive element will not be capable of moving linearly under this condition, it is obvious that the piston member 54 will not move downwardly under application of pressurized hydraulic or pneumatic fluid into the chamber 62 through inlet passage 64. Likewise, the compression spring 56 will be unable to impart upward movement to the piston 54 upon bleeding of the pressurized hydraulic fluid from actuation chamber 62. Upon rotation of the hand wheel and tubular drive element clockwise the threaded connection between the tubular drive element and the valve stem will impart upward movement to the valve stem thereby moving the valve element to its closed position. Likewise, upon rotation of the hand wheel 98 in counterclockwise manner, the valve stem, along with piston 54 and compression spring 56, will be moved upwardly, thereby imparting upward movement to valve element 26 and closing the valve.

The lock-out sleeve 110 and thrust bearing 106 are intended only for temporary use in the event it is desirable to completely lock out the power actuation system and rely only upon manual actuation to achieve opening and closing of the valve. The retainer sleeve and bearing assembly is easily installed with the valve and actuator system in the FIG. 2 or FIG. 3 positions thereof simply by removing the hand wheel structure and placing the retainer sleeve about the tubular drive element after which the hand wheel structure may be replaced. Alternatively, it may be appropriate to install semicylindrical retainer sleeve segments about the tubular drive element, which of course can be accomplished without necessitating removal of the hand wheel 98. The retainer segments may simply be implaced and retained by the annular extension 108 or in the alternative may be provided with any suitable means to maintain the segments in a generally cylindrical assembly subsequent to installation thereof.

Figure 5:
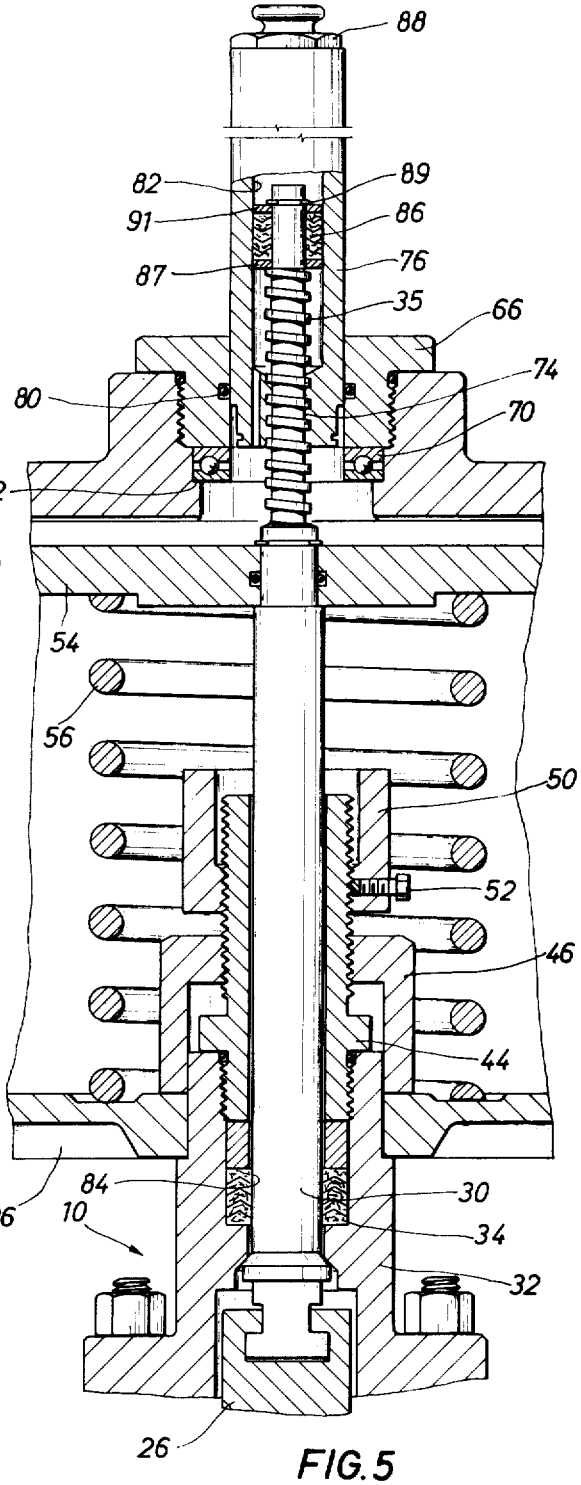
FIG. 5 is a fragmentary sectional view of the structure of FIG. 1 illustrating the actuator assembly without a manual override mechanism thereby illustrating ready adaptation of the override mechanism to the actuator assembly.

With reference now to FIG. 5 it may be desirable to completely disconnect the hand wheel structure 98 from the tubular drive element 76 and remove thrust shoulder 100 to make it mechanically impossible for unauthorized manual actuation of the gate valve structure. Also, under these conditions, the tubular drive element 76 may be provided appropriate indicia to serve as a position indicator by which the position of the gate element 26 may be monitored.

Referring now to FIG. 6, a modified embodiment of the present invention may conveniently take the form illustrated, where a valve 10 having a valve body 14 may include a bonnet structure 140 that may be bolted or otherwise secured to the valve body. A stem packing 142 may be retained within a stuffing box 144 defined within the bonnet and may be retained in position by a retainer element 146 surrounding a valve stem 148.

The bonnet 140 may be provided with a reduced diameter upper extremity providing an annular shoulder 150 that is engaged by the base 152 of a valve actuating mechanism, illustrated generally at 154. The upper extremity of the bonnet 140 may be provided with external threads 156 which receive the internal threads of a retainer element 158 to secure the base 152 in assembly with the bonnet. The base 152 may be provided with a recess 160 that receives a locator pin 162 therein when the base portion 152 of the valve actuator is properly aligned with respect to the bonnet structure.

A piston cylinder 164 may be retained in assembly with the base 152 by a snap-ring and bolt retainer assembly. A plurality of bolts 164 may be threadedly received by the base 152 and may connect a cylinder retainer 166 to the base to restrain downward movement of the cylinder relative to the base. A snap-ring 168 is disposed within a snap-ring groove formed within the cylinder 164, and engages an annular shoulder 170 formed on the base 152 to retrain movement of the cylinder relative to the base.

A bearing retainer 172 is threadedly received at the upper extremity of the piston 164 and serves to restrain a thrust bearing 174 in engagement with a thrust bearing shoulder 176 defined within a passage 178 in the upper extremity of the cylinder 164.

A tubular drive element 180 may extend through an aperture 182 formed in the bearing retainer 172 and may be provided with internal threads 184 within the lower portion thereof that are disposed in threaded engagement with external threads 186 defined at the upper extremity of the valve stem 148.

The valve actuator may include a piston element 188 having an internal generally cylindrical pocket 190 defined by a tubular portion 192 of the piston. A sealing element 194 may be retained within an appropriate groove formed within the upper extremity of the tubular portion of the piston to establish sealing engagement with a cylindrical surface 196 defining the outer periphery of the tubular drive element 180. The valve stem 148 extends through an aperture 198 formed in the lower tubular portion 192 of the piston which aperture is provided with an internal frustoconical shoulder 200 disposed in engagement with an external frustoconical shoulder 202 defined on the valve stem. The piston is retained in assembly with the valve stem by a piston retainer 204 that is threadedly received by the valve stem.

An adjustable downstop element 206 may be received by external threads 208 formed on the tubular portion of the piston 188. A set screw member 210 may be received within the downstop element and may lock the downstop element in any suitable position relative to the piston. The downstop element may be employed to limit downward movement of the piston and valve stem thereby positively aligning the passage of the gate member with the flow passages of the valve.

At the upper extremity of the valve stem 148 is carried a pressure balancing piston assembly including an annular packing 212 establishing sealed engagement between the valve stem and an internal cylindrical surface 114 of the tubular drive element 180. Upper and lower annular retainer members 216 and 218, respectively, are received about the upper portion of the valve stem on either side of the packing element 212 and serve to properly position the packing element and prevent pressure extrusion thereof. A retainer plug 220 may be provided with an externally threaded extension received by internal threads defined within the upper extremity of the valve stem 148 and may provide an annular shoulder 222 engaging the upper retainer 216 to secure the pressure balancing piston assembly in assembled relation with the valve stem.

For the purpose of imparting movement to the piston 188 in an upward direction, a compression spring 224 may be interposed between the base 152 and the piston 188. In absence of fluid under sufficient pressure above the piston 188 the compression 224 may be operative to move the piston upwardly and bring a removable shoulder element 226 into engagement with the bottom portion of the thrust bearing 174. To prevent the piston element from slamming as it is moved upwardly by the compression spring 224, the enlarged cylindrical bore 178 about the tubular drive element 180 cooperates with the removable shoulder 226 to serve a dash-pot function to cushion or retard rapid movement of the piston element. This feature effectively prevents slamming of the piston thereby preventing damage to the piston or cylinder structure of the actuator. A snap-ring or segment ring 228 may be received within an annular groove formed in the tubular drive element 180 to which may be appropriately secured the removable shoulder element 226. Connection between the removable shoulder element 226 and the snap-ring or segment ring 228 may be such that the shoulder element may be removed without disassembling the tubular drive element from the valve stem. This can be done with the valve in its closed position with pressure inside the drive sleeve and thus make the manual override mechanism inoperative.

A vent 230 may be formed within the tubular drive element bypassing the internally threaded portion thereof and thereby communicating any fluid that might leak past the pressure balancing piston assembly into the cylindrical pocket 190. The leaked fluid will then be vented from the cylindrical pocket through a vent aperture 232 defined in the tubular portion of the piston 188. A vent and position indicator aperture 234 may be defined within the base 152 thereby allowing pressurized fluid passing through vent aperture 232 to exit the valve actuator and provide an indication that repair of the pressure balancing assembly is required. A position indicator 236 may extend through the aperture 234 and may be physically connected to the piston 188 thereby giving a positive external visual indication of movement of the piston as the actuator is energized and showing the position of the piston at all times whether the mechanism is actuated by the fluid motor or by the manual override mechanism.

In the event it is necessary to repair or replace the pressure balancing assembly, such can be accomplished readily by removing the nut 238 that secures a hand wheel 240 to the upper extremity of the tubular drive element. An internal sealed plug 242 may then be unthreaded from within the tubular drive element thereby exposing the retainer plug 220. After the retainer plug has been unthreaded from its connection with the valve stem 148 the packing 212 and the retainers 216 and 218 may readily be removed. After the pressure balancing assembly has been replaced and has been secured by the retainer plug 220 the plug member 242 may be rethreaded into position, causing the sealing element 244 thereof to establish a seal with the internal cylindrical surface 114 of the tubular drive element, thereby positively closing the upper extremity of the tubular drive element and preventing fluid pressure passing through the valve stem passage 246 from being vented at the upper extremity of the tubular drive element.

It may be desirable to provide a means for completely deactivating the valve actuator in the event it is desired to conduct repair or servicing operations on apparatus subjected to fluid pressure controlled by the valve to which the actuator is affixed. Accordingly, such means for deactivating the valve actuator may conveniently take the form illustrated in FIGS. 7 through 11 where a tubular drive sleeve 246 is illustrated as being provided with a removable shoulder element 248 of similar construction as set forth in FIG. 6. The lower extremity of the tubular drive element 246 may be provided with an annular groove 250 within which may be received a seal assembly 252 establishing a fluid tight seal with a generally cylindrical surface 254 defined within a tubular extension 256 of a piston element 258. A vent passage 260 may be formed within the piston element and may extend from a generally cylindrical pocket defined by the cylindrical surface 254 through the piston structure as illustrated.

When the tubular drive element 246 is threaded onto the valve stem 262 to the [postion] *position* illustrated in FIG. 7, the vent 260 will be sealed by virtue of engagement between the sealing element and the cylindrical wall 254. Upon movement of the tubular drive element 246 to the FIG. 8 position thereof, the seal between the sealing element 252 and the cylindrical wall 254 will be broken and any fluid pressure applied above the piston 258 will be vented through vent passage 260 to the underside of the piston, thereby preventing downward actuation of the piston stem and valve gate. It is readily seen therefore that the tubular drive element, when unthreaded manually to the position illustrated in FIG. 8, will render the valve actuator completely inoperative by the pressurized fluid.

With reference now to FIGS. 9 and 10, there is disclosed a further modified embodiment providing a pneumatic interlock feature having the capability of venting fluid pressure to preclude fluid actuation of the actuator. A piston 264 may be provided with a generally centrally disposed tubular portion 266 defining a cylindrical pocket 268. A sealing element 270 may be provided adjacent the upper extremity of the tubular portion 266 and may establish sealed relation with an external generally cylindrical surface 272 formed on a tubular drive element 274. A vent controlling sealing element 276 may be received within an annular groove formed in the tubular drive element and may establish sealed relation with a cylindrical surface 278 to prevent fluid pressure from above the piston 264 from venting through a vent passage 280 defined within the piston structure. Upon movement of the tubular drive element 274, relative to the piston 264, the annular sealing member 276 will be moved out of contact with the cylindrical surface 278 thereby allowing pressurized fluid to vent through the vent passage 280 to preclude downward movement of the piston and valve stem.

With reference now to FIG. 11, there is disclosed a further modified embodiment of the present invention providing a pneumatic interlock feature that is also capable of venting fluid pressure from the valve actuator to prevent inadvertent opening or closing movement of the valve with which the actuator is associated.

A piston 259 of the valve actuator may be provided with a generally centrally disposed tubular portion defining a generally cylindrical pocket having a circular planar bottom wall or seat surface 255 disposed concentrically with a bore through which the valve stem 263 extends. A vent passage 261 may be formed within the tubular portion of the piston and may intersect the bore at a position below the circular seat surface 255.

A tubular stem drive element 247 having a shoulder element 249 affixed thereto may be provided with internal threads that threadedly engage external threads formed on the valve stem 263 essentially as shown in FIG. 7. The tubular drive element may be provided with an annular seal groove 251 at the lower extremity thereof within which may be disposed a sealing element 253 which, as illustrated in FIG. 11, may take the form of an O-ring or any other suitable seal configuration. The sealing element 253 is disposed for contact with the circular seal surface 255 as the tubular stem drive element is moved to its lowermost position, thereby effectively blocking communication between the vent passage and the pressure chamber of the actuator above the piston 259.

When it is desired to render the piston actuator inoperative, the tubular drive element 249 will be rotated relative to the valve stem causing the annular seal 253 to move out of sealing engagement with the circular seat surface 255. When this has occurred any pressure introduced into the pressure chamber of the valve actuator above the piston will enter the cylindrical pocket past the tubular drive element and will be vented through passage 261 into the lower chamber of the valve actuator. As indicated above, the lower chamber of the valve actuator is also vented to the atmosphere thereby allowing any fluid pressure introduced into the upper chamber of the valve actuator to be vented to the atmosphere.

Figure 12:
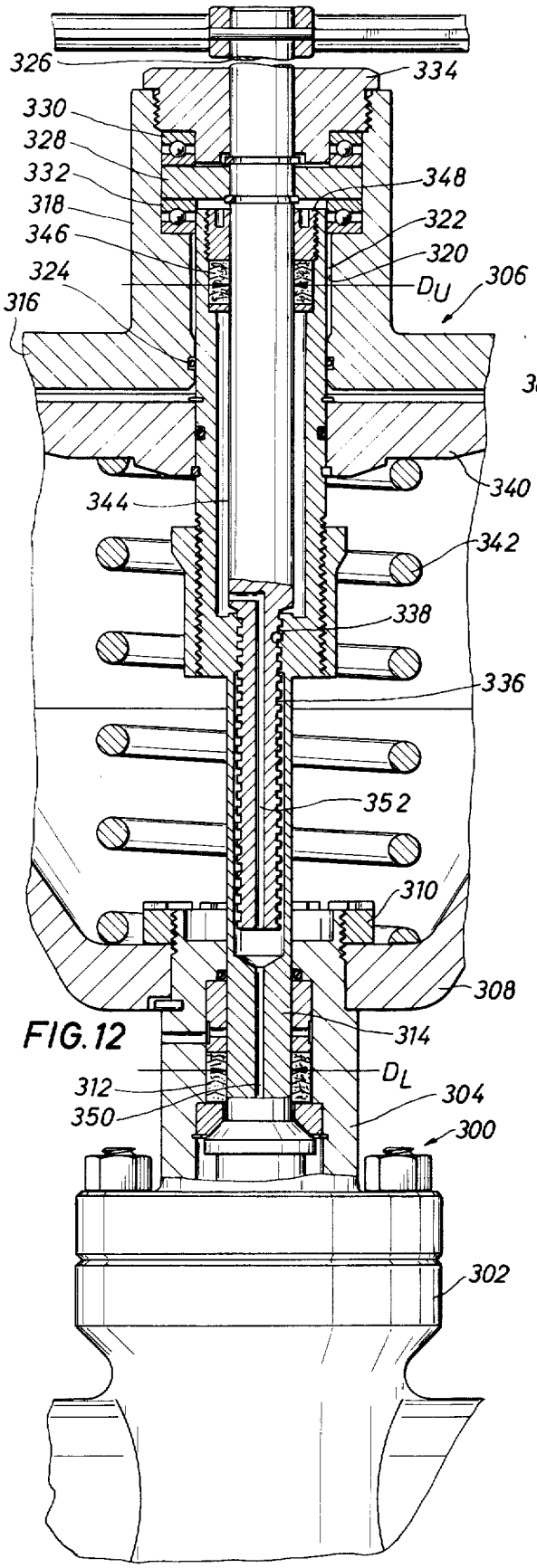
FIG. 12 is a fragmentary elevational view illustrated partially in section and showing a valve actuator mechanism representing a modified embodiment of the present invention.
Figure 13:
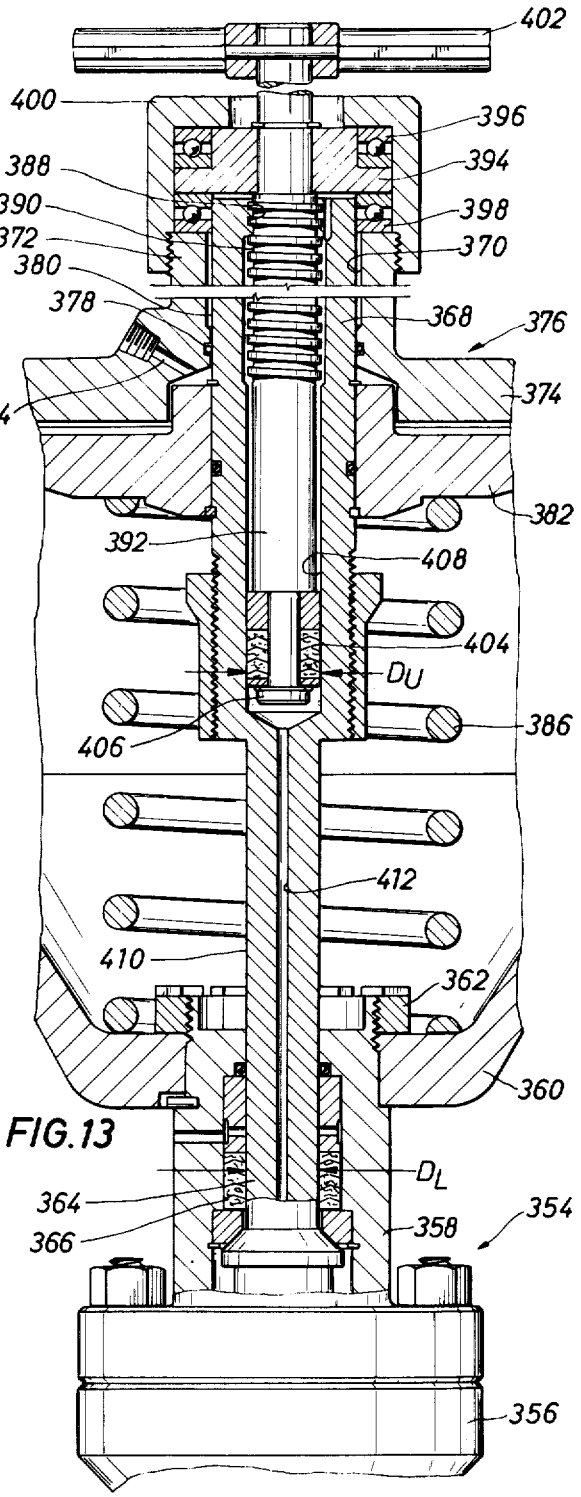
FIG. 13 is a fragmentary elevational view illustrated partially in section and showing a valve actuator mechanism representing a further modified embodiment of the present invention.

With reference now to FIGS. 12 and 13, it may be desirable to provide a valve structure having an internally threaded valve stem. FIGS. 12 and 13 represent structures that facilitate employment of the present invention in valve structures having internally threaded valve stems.

With reference now particularly to FIG. 12 there is shown a valve generally at 300 having a valve body 302 to which is connected a bonnet structure 304 by bolts as shown or by any other suitable means of connection.

A piston type valve actuator, illustrated generally at 306, may include a base or bottom wall 308 secured to the bonnet 304 by a retainer 310 threadedly received by an upper threaded portion of the bonnet 304. The bonnet may include a packing assembly 312 that establishes a dynamic seal with a valve stem 314 that is connected at its lower extremity to the valve gate, not shown, and extends through the bonnet structure into the valve actuator. The packing 312 cooperates with the valve stem 314 to define a cross-sectional area $D_L$ of the valve stem that is subjected to the pressure of the effluent controlled by the valve.

The valve actuator 306 may also include a cylindrical housing portion similar to that illustrated in FIG. 6 having an upper wall 316 provided with a centrally located boss 318. The valve stem 314 may extend upwardly through the housing portion of the valve actuator and the upper extremity of the valve stem 314 may be received within a passage 320 that extends upwardly into the boss 318. The upper extremity of valve stem 314 may be provided with a generally cylindrical surface 322 that is maintained in sealed engagement with the upper wall 316 of the valve actuator 306 by an annular sealing element 324 contained within an appropriate groove provided therefor.

A rotatable actuator stem 326 may extend through the passage 320 of the boss and may include an annular flange 328 that may be disposed in engagement with upper and lower thrust bearings 330 and 332, respectively, which flange and bearings may be retained in assembly with the boss 318 by a retainer element 334 that may be disposed about the upper extremity of the actuator stem and may be threadedly received at the upper extremity of the boss 318. The lower portion of the actuator stem 326 may extend through the tubular valve stem 314 and may be provided with external threads 336 that may be received by internal threads 338 defined within the valve stem. As the actuator stem 326 is rotated, reciprocation of the actuator stem is restrained by the thrust bearings and the retainer element 334. The threaded engagement between the threads 336 and 338 of the actuator stem and valve stem, respectively, transmits the rotary movement of the actuator stem 326 into vertical movement of the valve stem, thereby causing reciprocation of the gate element to control the flow of effluent through the valve.

A piston 340 may be fixed to the valve stem in any appropriate manner and may be provided with edge portions disposed in dynamic sealed engagement with the cylindrical side wall of the valve actuator 306 in similar manner as illustrated above regarding FIG. 6, thereby dividing the valve actuator into upper and lower chambers. Fluid pressure may be introduced from any appropriate controlled source of pressurized actuator fluid into the upper chamber above the piston 340 thereby urging the piston and the valve stem 314 downwardly, imparting downward movement to the gate element of the valve. Downward movement of the piston 340 may be opposed by the bias of a compression spring 342 disposed within the lower chamber between the base 308 and the piston 340. The compression spring is operative to impart upward movement to the piston 340 when the pressure within the upper chamber of the actuator is below the level necessary to overcome the bias of the spring 342. Closure of the valve, therefore, may be accomplished simply by bleeding fluid pressure from the upper chamber of the actuator to allow the compression spring 342 to move the piston stem and gate upwardly to the closed position thereof. It is obvious, therefore, that rupture of a control conduit supplying pressurized actuation fluid to the upper chamber of the actuator, will cause the spring 342 to automatically induce movement of the piston stem and gate to a predetermined safe position. Such safe position may be "open" or "closed," depending upon the position of the port within the gate element.

To eliminate or control the amount of thrust force induced by the pressure of the effluent controlled by the valve to the valve stem 314, it may be desirable to direct the pressurized effluent to act upon an equivalent surface area at the opposite extremity of the valve either to achieve a balanced force condition or to achieve a resultant force biasing the valve stem in either direction thereof. Accordingly, means for accomplishing this feature may conveniently take the form illustrated in FIG. 12, where the actuating stem 326 is shown to be provided with an external cylindrical surface 344 of substantially the same dimension as the cylindrical surface disposed in contact with the packing assembly 312. A dynamic seal may be established between the tubular upper portion of the valve stem and the cylindrical surface 344 of the actuator stem by an upper packing assembly 346 that may be retained in assembly with the valve stem by a retainer member 348 disposed about the actuator stem and threadedly received at the upper portion of the valve stem.

The packing assembly 346 cooperates with the cylindrical surface 344 to define a cross-sectional area $D_u$ that may be of substantially the same dimension as the cross-sectional area $D_L$ if a balanced force condition is desired. If an unbalanced force condition is desired, producing an upward or downward resultant force acting upon the valve stem, the cross-sectional area $D_u$ will, of course, be of smaller or larger dimension than the cross-sectional area $D_L$.

For the purpose of introducing effluent pressure into the tubular portion of the valve stem, a passage 350 may be defined within the lower portion of the valve stem and may open into the valve chamber. A passage 352 may be formed in the actuator stem 326 to [conduit] *conduct* fluid pressure past the threaded connection between the actuator stem and drive stem.

Referring now to FIG. 13, a further modified embodiment of the present invention may incorporate a valve, illustrated generally at 354, having a valve body 356 to which may be connected a bonnet 358 by a plurality of bolts or by any other suitable means of connection. An actuator base 360 may be secured to the bonnet 358 by a retainer element 362 threadedly received at the upper extremity of the bonnet. A valve stem 364 may extend upwardly from the valve through a packing assembly 366 disposed within the bonnet with an upper tubular extremity 368 thereof received within a passage 370 defined within a boss 372 provided on the upper wall 374 of the cylinder portion of a valve actuator illustrated generally at 376. The tubular portion of the valve stem may be sealed with respect to the housing by an annular sealing element 378, retained within an internal groove formed within the boss 372, which sealing element establishes a dynamic seal with a cylindrical surface 380 defining the exterior periphery of the tubular portion 368 of the valve stem.

A piston element 382 may be fixed in sealed relation to the tubular portion of the valve stem in any desirable manner with its outer periphery disposed in dynamic sealed engagement with a cylindical wall of the actuator housing in similar manner as illustrated in FIG. 6. Downward movement of the piston 382 may be induced by pressurized fluid introduced from any suitable source of actuation fluid through an inlet passage 384 into a chamber defined within the actuator housing above the piston. The pressure of the actuation fluid must be sufficient to overcome the force of a compression spring 386 interposed between the base 360 and the piston 382. The valve actuator 376 will function under the influence of pressurized actuation fluid introduced above the piston 382 in similar manner as discussed above regarding FIG. 12.

It may be desirable to impart movement to the gate element manually to control the flow of fluid through the valve in the event the piston actuator should become inoperative or, if for some other reason, manual actuation is desired. Accordingly, a mechanism for inducing manual actuation of the gate valve mechanism may conveniently take the form illustrated in FIG. 13 where the tubular portion 368 of the valve stem 364 is shown to incorporate internal threads 388 that receive external threads 390 defined on a rotatable actuator stem 392. A thrust flange 394 may be fixed to the actuator stem 392 and may be disposed in engagement with upper and lower thrust bearings 396 and 398, respectively, that are retained in assembly with the flange and with the actuator housing by a retainer element 400 disposed about the bearings and flange and threadedly secured to the upper extremity of the boss 372. The thrust bearings and flange cooperate to prevent vertical movement of the valve stem 392 as it rotates thereby inducing vertical movement to the valve stem 364 by virtue of the threaded connection between the actuator stem and the tubular portion of the valve stem. The actuator stem may be rotated by a hand wheel 402 or by any other suitable mechanism fixed in nonrotatable relation to the upper extremity of the actuator stem.

It may be desirable, as indicated above, to establish a balanced or controlled force condition acting on the valve stem to allow the valve stem to be reciprocated free by application of relatively low torque forces applied to the actuating stem 392. A mechanism for accomplishing such balancing or controlling of resultant forces may conveniently take the form illustrated in FIG. 13 where a packing element 404 is shown to be fixed to the lower extremity of the actuator stem by a bolt 406 or by any other appropriate means and which establishes a dynamic seal with an inner cylindrical surface 408 defined within a tubular portion of the valve stem. The seal between the packing 404 and the cylindrical surface 408 defines a cross-sectional area $D_u$ which may, if balanced stem force conditions are desired, be substantially equal to a cross-sectional area $D_L$ defined by dynamic sealed engagement between the packing 366 and a cylindrical surface 410 defined by the lower portion of the valve stem. In the event unbalanced force conditions are desired, the cross-sectional area $D_u$ may, of course, be larger or smaller than the cross-sectional area defined at $D_L$.

The balanced or resultant force condition will be induced by the pressurized effluent controlled by the valve which may act through a pressure balancing passage 412 defined within the valve stem 364 and disposed in fluid communication with the valve chamber of the valve. Thus, the valve stem will be in a balanced condition during operation or will be subjected to designed resultant force loading to permit ease of actuation. Moreover, the valve may be actuated between the open and closed positions thereof exclusive of the actuating mechanisms simply by manipulating the hand wheel to induce rotatable movement to the actuating stem 392.

While FIGS. 12 and 13 illustrate valve actuator structures incorporating both a fluid energized actuating mechanism and a manual actuating mechanism, it is intended that only one of these mechanisms be capable of actuation without minor alteration. This feature allows the actuating mechanism to be readily changed from one actuating mode to another simply and quickly in the field without complete overhaul of the actuator.

As shown in FIGS. 15 and 16, both of the modifications are adapted for manual actuation. Movement of the valve stem may be achieved simply by rotating the hand wheel and actuating stem in each case to impart partial movement to the valve stem. The piston actuator in each case is inoperative because the actuator stem is restrained against vertical movement by the cooperating thrust bearings 330 and 332 as shown in FIG. 12 for example, which restrain the annular shoulder 328 against vertical movement.

If it is desired to convert the actuating mechanism to fluid actuation, this can be accomplished simply by removing the retainer 334 which allows the upper bearing 330 to be removed. The annular shouler element then may be removed simply by removing the upper snap ring element that secures it in assembly with the actuating stem 344. The lower thrust bearing may be easily removed after the annular shoulder 328 has been disassembled from the actuator stem.

The thrust flange 394 and the thrust bearings 396 and 398 illustrated in FIG. 13 may be removed to allow fluid actuation of the actuating mechanism simply by unthreading the retainer element from the actuator housing and by removing the upper snap ring that secures the thrust flange 395 in assembly with the actuator stem.

It is obvious that the pressure balancing concept of the present invention will function equally well when incorporated with a valve and hydraulic or pneumatic actuator assembly. The pressure balancing concept of the present invention does not in any way interfere with a manual override system with which a rising stem type gate valve may be provided. The invention effectively provides a valve and actuator assembly having a manual override mechanism to operate the valve exclusive of the pneumatic or hydraulic actuator system. The invention further incorporates a mechanism for selectively deactivating the actuator mechanism to allow personnel to safely service or repair a flow system controlled by the valve and actuator assembly. The invention therefore effectively achieves all of the objects hereinabove set forth together with other objects and advantages that are inherent from a description of the apparatus itself. While the above description has referred to particular embodiments of the invention, it is to be understood that the subject apparatus may also be incorporated into other structures without departing from the spirit or scope of this invention. It is to be further understood that the embodiments described and illustrated herein are merely illustrative of an application of the principles of the invention and that numerous other arrangements and modifications may be made in the structures illustrated without departing from the spirit and scope of this invention.

Having thus fully described my invention, I claim:

1. A valve and actuator assembly comprising:

valve body means defining a valve chamber and having flow passage means intercepting said valve chamber;

seat means disposed within said valve chamber about said flow passage means;

gate means being movably disposed within said valve chamber and having sealing engagement with said seat means, said gate having a flow port for registry with said flow passage means to conduct the flow of effluent through said valve and having an imperforate portion to block the flow of effluent;

bonnet means defining a closure for said valve chamber;

fluid motor means being carried by said bonnet means and having piston means movably disposed therein;

valve stem means having upper and lower extremities, the lower extremity being connected to said gate means and being connected to said piston means, said valve stem means cooperating with said valve body to define a first pressure responsive area of said stem means;

stem drive means engaging said stem means and being operative to impart reciprocal movement to said stem means;

balancing means carried by said stem means and cooperating with said stem drive means to define a second pressure responsive area of said stem means; and means communicating effluent pressure from said valve chamber to each extremity of said valve stem and causing pressure induced forces acting on said first and second pressure responsive areas of said stem to be substantially balanced.

2. A valve and actuator assembly as recited in claim 1:

said fluid motor means comprising a closed piston housing being fixed to said bonnet and having top and bottom walls and a generally cylindrical wall;

said piston dividing said housing into first and second chambers;

means communicating pressurized actuating fluid into said first chamber to impart movement to said piston and said valve stem in one direction;

means venting said second chamber; and means urging said piston in a direction opposing said one direction.

3. A valve and actuator assembly as recited in claim 1:

said means communicating effluent pressure from said valve chamber to each extremity of said valve stem comprising passage means defined axially through said valve stem.

4. A valve and actuator assembly as recited in claim 1:

said stem having threads formed thereon;

said stem drive means comprising a tubular stem drive element received in surrounding relation about the outer extremity of said stem, said drive element having internal threads at the lower extremity thereof, said threads being disposed in threaded engagement with said stem;

means establishing a first seal between said valve bonnet and said stem and defining a first pressure responsive cross-sectional area on said stem;

a pressure balancing piston carried by said stem and establishing a second seal between said stem drive means and said stem and defining a second pressure responsive cross-sectional area; and said means communicating effluent pressure from said valve chamber to each extremity of said valve stem causing said effluent pressure to act simultaneously on said first and second cross-sectional areas.

5. A valve and actuator assembly as recited in claim 4:

said means establishing said first seal comprising a first packing retained within said bonnet and disposed in dynamic sealed engagement with said valve stem.

6. A valve and actuator assembly as recited in claim 4:

said pressure balancing piston comprising a second packing being carried by said valve stem and disposed in dynamic sealed engagement with the inner surface of said tubular drive element.

7. A valve and actuator assembly as recited in claim 4:

said means establishing said first seal comprising a first packing retained within said bonnet and disposed in dynamic sealed engagement with said valve stem; and said pressure balancing piston comprising a second packing being carried by said valve stem and disposed in dynamic sealed engagement with the inner surface of said tubular drive element.

8. A valve and actuator assembly as recited in claim 7:

vent passage means being defined in said tubular drive element and venting any leakage of effluent pressure of said second packing into said fluid motor means.

9. A valve and actuator assembly as recited in claim 4:

said fluid motor means comprising a piston housing being fixed to said bonnet and having top and bottom walls and a generally cylindrical wall;

said tubular drive element extending through said top wall in sealed relation therewith; and means closing the outer extremity of said tubular stem drive element and defining a pressure balancing chamber outwardly of said valve stem.

10. A valve and actuator assembly as recited in claim 9:

said means communicating effluent pressure from said valve chamber to each extremity of said valve stem comprising an effluent passage formed in said valve stem; and said effluent passage conducting pressurized effluent from said valve chamber to said pressure balancing chamber.

11. A valve and actuator assembly as recited in claim 4:

said first and second cross-sectional areas being of substantially equal dimension.

12. A valve and actuator assembly as recited in claim 4:

said first and second cross-sectional areas being of different dimension.

13. A valve and actuator assembly as recited in claim 4:

means for blocking communication between said valve chamber and the outer extremity of said valve stem in at least one position of said stem.

14. A valve and actuator assembly as recited in claim 13:

said means for blocking communication between said valve chamber and the outer extremity of said valve stem comprising a first seat surface defined on said stem inwardly of said passage means;

a second seat surface defined by said bonnet; and said first and second seat surfaces being brought into sealed engagement upon movement of said stem to the outermost position thereof.

15. A valve and actuator assembly comprising:

valve body means defining a valve chamber and having flow passge means intercepting said valve chamber;

gate means being movably disposed within said valve chamber and having a flow port for registry with said flow passage means to conduct the flow of effluent through said valve and having a solid portion to block the flow of effluent;

bonnet means defining a closure for said valve chamber;

a fluid motor being carried by said bonnet and having a housing defined by top and bottom walls and a generally cylindrical wall;

a piston being [removably] *movably* disposed within said housing and dividing said housing into first and second chambers;

means communicating pressurized actuating fluid into said first chamber to impart movement to said piston and said valve stem in one direction;

means venting said second chamber;

means imparting a force to said piston in a direction opposing said one direction;

valve stem means interconnecting said gate means and said piston, said valve stem having upper and lower extremities and cooperating with said valve body to define a first pressure responsive area of said stem;

stem drive means engaging said stem means and being operative to impart reciprocal movement to said stem means;

balancing means carried by said stem means and cooperating with said stem drive means to define a second pressure responsive area of said stem means; and means communicating effluent pressure from said valve chamber to each extremity of said valve stem and causing pressure induced forces acting on said first and second pressure responsive areas of said stem to be substantially balanced.

16. A valve and actuator assembly as recited in claim 15:

said stem drive means being a tubular stem drive element received about the outer extremity of said stem and being disposed in threaded engagement with said stem;

means establishing a first seal between said valve bonnet and said stem and defining a first cross-sectional area of said stem;

means establishing a second seal between said stem drive means and said stem and defining a second cross-sectional area of said stem; and said means communicating effluent pressure from said valve chamber to each extremity of said valve stem causing said effluent pressure to act simultaneously on said first and second cross-sectional areas.

17. A valve and actuator assembly as recited in claim 15:

said stem drive means being a tubular stem drive element received about the outer extremity of said stem and being disposed in threaded engagement with said stem;

a first packing being retained within said valve bonnet and being disposed in dynamic sealed engagement with said valve stem; and second packing means being carried by said valve stem and disposed in dynamic sealed engagement with said tubular drive element.

18. A valve and actuator assembly as recited in claim 17:

said tubular drive element extending through said top wall in sealed relation therewith;

means for imparting movement to said tubular drive element.

19. A valve and actuator assembly as recited in claim 18:

bearing means being carried by said closed housing of said fluid motor;

flange means being carried by said tubular stem drive element; and said flange means being engagable with said bering means to restrict outward movement of said tubular stem drive element.

20. A valve and actuator assembly as recited in claim 15:

means for venting any effluent pressure leaked past said second seal past said piston and into said second chamber of said fluid motor.

21. A valve and actuator assembly as recited in claim 15:

said piston having a central vent receptacle;

said tubular stem drive element being received within said vent receptacle;

means establishing a seal between said piston and said tubular stem drive element and cooperating with said piston and tubular stem drive element to define a leakage vent chamber; and a port defined in said piston and communicating said leakage vent chamber with said second chamber of said fluid motor.

22. A valve and actuator assembly as recited in claim 15:

said fluid motor means having mechanical means for selectively preventing fluid actuation of said fluid motor means.

23. A valve and actuator assembly as recited in claim 15:

said stem drive means threadedly engaging said valve stem and extending outwardly of said housing;

stop shoulder means being defined on said stem drive means; and fluid motor lock-out means adapted to be interposed between said fluid motor means and said stop shoulder means to prevent fluid actuation of said fluid motor means.

24. A valve actuator assembly as recited in claim 23:

said lock-out means comprising sleeve means disposed about said stem drive means;

lock-out bearing means being carried by said housing; and said lock-out means being interposed between said lock-out bearing means and said stop shoulder means.

25. A valve and actuator assembly as recited in claim 15:

said stem drive means comprising a rotatable element being disposed in threaded engagement with said valve stem means and extending through said top wall of said housing;

means defining an internal *stop* shoulder on said housing; and thrust shoulder means being carried by said stem drive means within said housing and being engageable with said internal stop shoulder to limit axial movement of said stem drive means in one direction.

26. A valve and actuator assembly as recited in claim 25:

said thrust shoulder means being removable from said stem drive means to render said stem drive means inoperative.

27. A valve and actuator assembly as recited in claim 15:

adjustable stop means being carried by said piston;

means facilitating adjustment of the position of said stop means relative to said piston; and said stop means engaging a portion of said fluid motor to limit movement of said piston, said valve stem means and said gate means in one direction to positively align said flow port with said flow passage means.

28. A valve and actuator assembly as recited in claim 27:

said means facilitating adjustment of said stop means comprising threads formed on said piston;

said stop means being disposed in threaded engagement with said threads of said piston; and lock means carried by said stop means and being operative to lock said stop means relative to said piston.

29. A valve and actuator assembly as recited in claim 15:

means defining a cushioning chamber within said housing; and means being movable into said cushioning chamber upon movement of said piston under influence of said force imparting means and compressing a quantity of fluid within said cushioning chamber to dissipate energy imparted to said piston by said force imparting means thereby cushioning travel of said piston means at one extremity of travel of said piston means.

30. A valve and actuator assembly as recited in claim 29:

said means defining a cushioning chamber comprising a cushioning recess defined in said top wall of said housing; and said means being movable into said cushioning chamber being a thrust shoulder carried by said drive stem means and being received in close fitting relation within said cushioning recess.

31. A valve and actuator assembly as recited in claim 15:

position indicator means being carried by said fluid motor means and being movable responsive to both fluid actuation or mechanical actuation of said valve stem to indicate the position of said gate means.

32. A valve and actuator assembly as recited in claim 31:

said bottom wall of said housing having an aperture formed therein; and said piston indicator means being an elongated member carried by said piston and extending through said aperture.

*33. A valve and actuator assembly comprising:*

*valve body means defining a valve chamber and having flow passage means intercepting said valve chamber;*

*gate means being movably disposed within said valve chamber and having a flow port for registry with said flow passage means to conduct the flow of effluent through said valve and having a solid portion to block the flow of effluent;*

*bonnet means defining a closure for said valve chamber;*

*a fluid motor means attached to said bonnet means and having a housing defined by top and bottom walls and a generally cylindrical wall;*

*a piston being movably disposed within said housing and dividing said housing into first and second chambers;*

*means communicating pressurized actuating fluid into said first chamber to impart movement to said piston and said valve stem in one direction;*

*means venting said second chamber;*

*means imparting a force to said piston in a direction opposing said one direction;*

*valve stem means interconnecting said gate means and said piston;*

*stem drive means engaging said stem means and being operative to impart reciprocal movement to said stem means;*

*means defining an internal shoulder on said top wall of said housing;*

*thrust shoulder means being carried by said stem drive means within said housing and being engageable with said internal shoulder to limit axial movement of said stem drive means in one direction;*

*passageway means being defined in said piston to vent said actuating fluid from said first chamber into said second chamber; and*

*vent seal means being positionable in sealing relation between said stem drive means and said piston to block said passageway means and being positionable in non-sealing relation with said piston to open said passageway means.*

*34. A valve and actuator assembly as recited in claim 33 wherein:*

*said stem drive means is a tubular stem drive element received about the outer extremity of said stem and being disposed in threaded engagement with said stem,*

*said stem drive means extending outwardly through said housing of said fluid motor means and having a dynamically sealed relationship with said housing of said fluid motor means.*

*35. A valve and actuator assembly as recited in claim 33, wherein*

*vent seal surface means is formed by said piston;*

*seal retainer means is provided on said stem drive means; and*

*said vent seal means is positively supported by said seal retainer means.*

*36. A valve and actuator assembly comprising:*

*valve body means defining a valve chamber and having flow passage means intercepting said valve chamber;*

*gate means being movably disposed within said valve chamber and having a flow port for registry with said flow passage means to conduct the flow of effluent through said valve and having a solid portion to block the flow of effluent;*

*bonnet means defining a closure for said valve chamber;*

*a fluid motor means attached to said bonnet means and having a housing defined by top and bottom walls and a generally cylindrical wall;*

*a piston being movably disposed within said housing and dividing said housing into first and second chambers;*

*means communicating pressurized actuating fluid into said first chamber to impart movement to said piston and said valve stem in one direction;*

*means venting said second chamber;*

*means imparting a force to said piston in a direction opposing said one direction;*

*valve stem means interconnecting said gate means and said piston, said valve stem cooperating with said body to define a first pressure responsive area of said stem;*

*stem drive means engaging said stem means and being operative to impart reciprocal movement to said stem means;*

*balancing means being provided for said stem means and cooperating with said stem drive means to define a second pressure responsive area of said stem means;*

*means communicating effluent pressure from said valve chamber to each of said pressure responsive areas of said valve stem means and causing pressure induced forces acting on said first and second pressure responsive areas of said stem means to be substantially balanced;*

*means defining an internal shoulder on said top wall of said housing;*

*thrust shoulder means being carried by said stem drive means within said housing and being engageable with said internal shoulder to limit axial movement of said stem drive means in one direction;*

*passageway means being defined in said piston to vent said actuating fluid from said first chamber into said second chamber; and*

*vent seal means being positionable in sealing relation between said stem drive means and said piston to block said passageway means and being positionable in non-sealing relation with said piston to open said passageway means.*

*37. A valve and actuator assembly as recited in claim 36 wherein:*

*said stem drive means is a tubular stem drive element received about the outer extremity of said stem and being disposed in threaded engagement with said stem, said stem drive means extending outwardly through said housing of said fluid motor means and having a dynamically sealed relationship with said housing of said fluid motor means.*

* * * * *